United States Patent [19]

Mead

[11] 4,155,621
[45] May 22, 1979

[54] IMAGE STABILIZER FOR VIEWING DEVICES

[76] Inventor: John A. Mead, 1600 Dena Dr., Richmond, Va. 23229

[21] Appl. No.: 865,425

[22] Filed: Dec. 29, 1977

[51] Int. Cl.² .......................................... G02B 23/00
[52] U.S. Cl. .................................................. 350/16
[58] Field of Search ........................ 350/16; 354/70; 33/275 G

[56] References Cited

U.S. PATENT DOCUMENTS

| 2,811,042 | 10/1957 | Kenyon ................................. 350/16 |
| 3,006,197 | 10/1961 | Kenyon et al. ...................... 350/16 |
| 3,558,212 | 1/1971 | Ritchie ................................. 350/16 |

Primary Examiner—Jon W. Henry

[57] ABSTRACT

In order to counteract the image jitter caused by vibrations of the platform on which a viewing instrument is being held, a reflector surface on the optic path within the instrument case is rotated by the combined shaft output of a precessing gyro and viscous dampener. In accordance with gyroscopic action the spin axis is perpendicular to the precession shaft and also to the axis about which the image is to be stabilized. Dampening is set to rotate the reflector in proportion to gyro precession.

3 Claims, 11 Drawing Figures

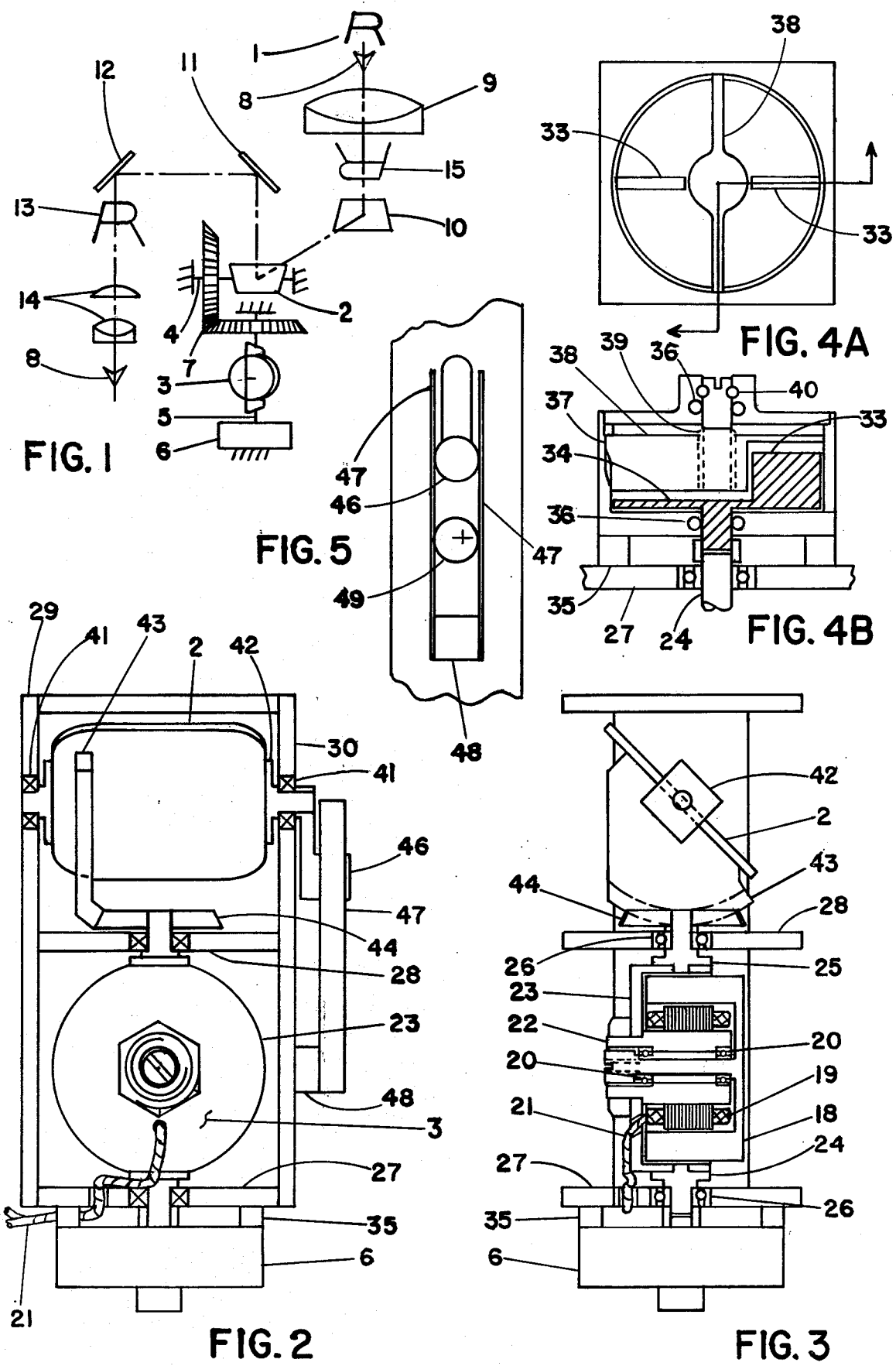

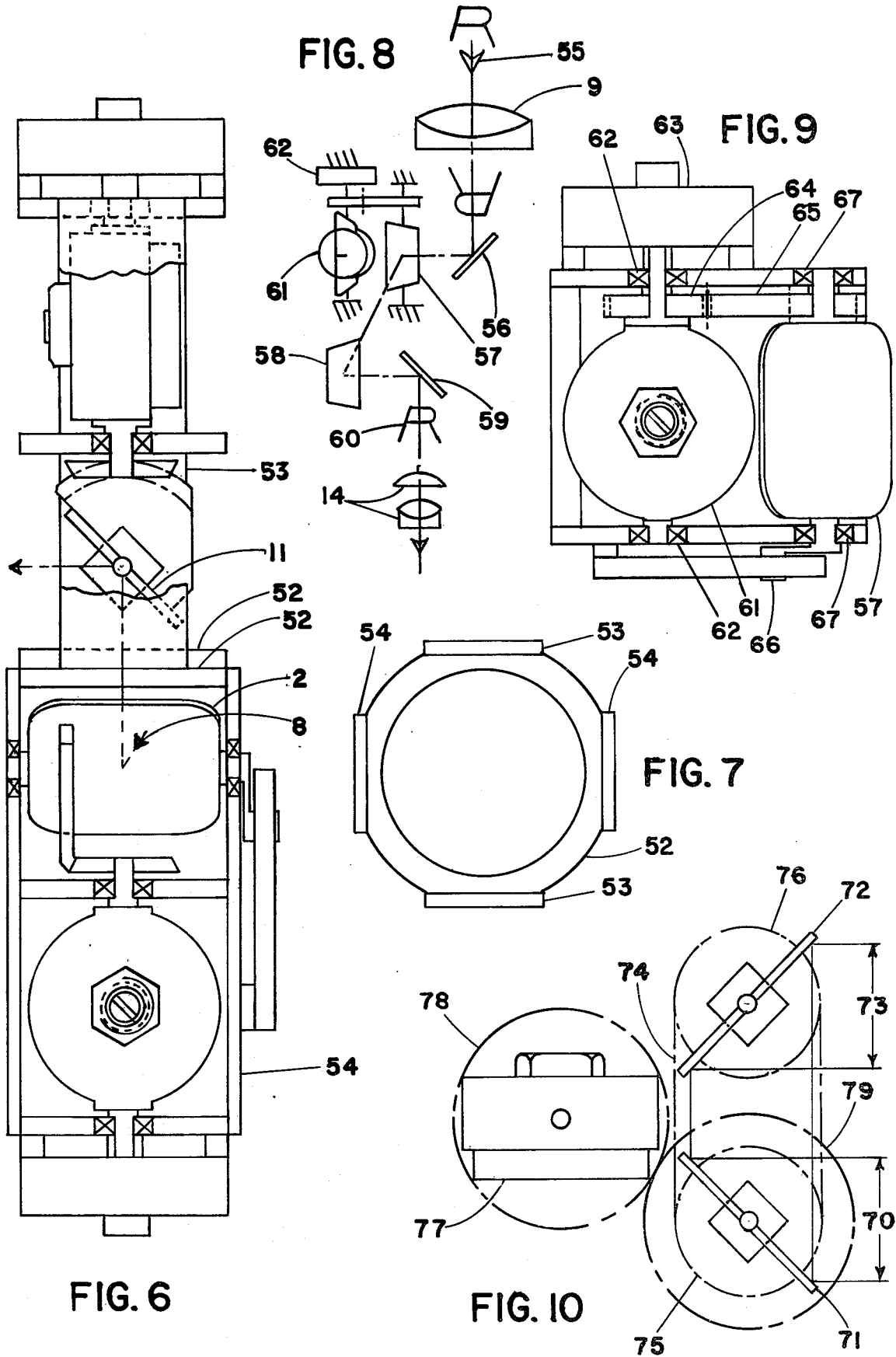

IMAGE STABILIZER FOR VIEWING DEVICES

BACKGROUND AND OBJECTS

There have been many approaches to removing accidental image oscillations which appear in optical viewing devices with the use of gyroscopes. Some efforts have been made to incorporate massive wheels into the instrument housing for brute force stabilization. These devices make a valiant effort at first, but soon become unwieldly and confusing to the operator. The principal endeavor thus far in the art has been directed toward space stabilizing an optic element with the aid of the classic two-degree-of-freedom or "free" gyro. This consists, in the main, of a member housing the wheel surrounded by a gimbal that contains two axes orthogonal to the spin axis of stabilization about either or both of the latter two or gimbal axes. In all instances where reference is made to the stabilizing mechanism as a compartment called "stabilizer" or other similar connotation, the free gyro is understood. This approach to image stabilization entails a rather large and cumbersome mechanism requiring special assembly techniques to exact a close balance of several members and also requiring a friction-free condition at gimbal support bearings. Power for motivation is supplied by the angular momentum of the wheel whose space reference is subject to drift in less than one minute's time. Moreover, lens system must usually be added and optic paths are interrupted in unseemly fashion. Also, in some cases, a two-degree-of-freedom assembly is included for each separate axis to be stabilized in order to avoid the effects of cross coupling. Finally, in slaving a free gyro back to its neutral position relative to the case, all manner of complicated erection systems must be invented.

The present invention proposes to mount one or more of the reflectors which are needed to invert or reverse the image onto pivots and add alongside a small gyro for coupling thereto. This gyro is the single-degree-of-freedom type, having only one gimbal or output axis extending from the spin wheel housing. Further objects intended include that a typical embodiment from the invention would:

(1) Offer mechanical compensation directly in the form of a positive shaft rotation.
(2) Manipulate the stabilizing element without interrupting or otherwise interfering with the optic path.
(3) Incorporate simple slaving means with classic rate gyro mode.
(4) Add only a few, if any, optic components to those already needed in the system before stabilization.
(5) Be very beneficial to photo cameras.

SUMMARY

The invention at hand makes use of gyroscopic precession enforced by a case disturbance about one axis coacting with the restraining torque of a viscous dampening mechanism to produce the shaft angle required for rotating a reflector surface to counteract the image motion caused by said disturbance. The angular velocity of instant precession, $\omega_p$, is derived from a torque, $T_1$, furnished by the operator as he succumbs to an ambient vibration while holding the instrument according to the relation $\omega_p = T_1/H$, where H is the product of rotor inertia and spin velocity or angular momentum. On this same axis between precessing gyro and case is mounted the viscous dampener whose angular velocity, $\omega_d$, is proportional to $T_2/C$, where $T_2$ is the restraining torque it develops. The interaction of these velocity-conscious torques allows precession to gather speed until an equal and opposite torque builds in the dampener ($T_1 = T_2$) and an output angle is realized at the gimbal axis which bears a direct relation to the angle of case motion which initiated precession. This relation is controlled by the damping constant, C, in a fairly Newtonian device; so that, when C is set for $H/C = 1$, the gyro will precess one degree at the output axis for one degree of disturbing motion or input angle. Viscous damping thus introduces an integration which transforms gyro precession from an angular rate to a displacement, endowing the unit with a memory of sorts which is the premise for floated gyros in servoed inertial platforms.

DESCRIPTION OF THE DRAWINGS

FIG. 1 is a mechanical schematic (top view) for stabilization in pitch showing image erecting reflectors with gyro and dampener.

FIG. 2 is a mechanical layout (top view) of FIG. 1.

FIG. 3 is a cross section (side elevation) of FIG. 2.

FIG. 4A is a cross section (top view) of the dampener.

FIG. 4B is a cross section (side elevation) of FIG. 4A.

FIG. 5 is a side elevation of the spring attachment.

FIG. 6 is a mechanical layout (top view) of an inline assembly of twin stabilizers for two-axis operation.

FIG. 7 is an end elevation of FIG. 6 at the section where the stabilizers join.

FIG. 8 is a mechanical schematic (top view) for stabilization in pitch with reflector and gyro dampener axes parallel.

FIG. 9 is a mechanical layout (top view) of FIG. 8.

FIG. 10 is a functional layout (side elevation) showing two reflectors geared at right angles being driven by gyro-dampener per FIG. 9.

DESCRIPTION OF PREFERRED EMBODIMENTS

Most vehicle suspensions are designed to contend with gravity and thus demonstrate a pattern of sympathetic reaction in a vertical direction. For this reason disturbing oscillations are predominantly about a pitch axis. In addition, any hand-held viewing instrument is liable to relay this motion through innate body stiffness. Comparative measurements on boats, autos, and helicopters have demonstrated that, on a scale of 4, spurious vibrations are most prevalent in pitch, at 4, then yaw, at 2, followed by roll, at 1.

Although the following disclosure offered for public dissemination is detailed to ensure adequacy and to aid understanding, this is not intended to prejudice that purpose of a patent which is to cover each new inventive concept therein no matter how others may later disguise it by variations in form or addition or further improvements. For instance, although reference will constantly be made in the text to viewing instruments with an ocular lens, it should be understood that the image plane on which the ocular focuses can, with equal utility, be used as the film plane in a photo camera. Similarly, the instrument case can be supported by a camera mount or other platform rather than be hand-held.

Referring now to FIG. 1 in describing a system to stabilize against accidental vibratory motion in pitch only, a bundle of light rays encompassing the object 1 is horizontally incident to a viewing case (not shown)

which is held upright in front of the operator and houses the members shown as seen from above, which members are all fixed to the case except reflector surface 2 and gyro 3 that pivot relative to the case about axes 4 and 5 respectively. Gyro 3 drives the impeller of dampener 6 which is secured to the case at axis 5. Reflector 2 and gyro 3 are coupled to rotate at right angles through bevel gears 7 or other suitable linkage. The ray bundle can be followed in its path through the instrument by tracing the principal ray 8 at it traverses objective lens 9, shown as Fraunhofer with convex crown and concave flint, horizontally downward in the plane of the paper, reflects off mirror 10 vertically up and out of the plane of the paper, reflects off stabilizer mirror 2 horizontal again and upward, reflects off mirror 11 horizontally to the left, reflects off mirror 12 horizontally downward, and finally converges on the image plane at 13, whence it continues in a straight line to traverse the ocular lens system 14, shown as achromatized Ramsden, onto an exit pupil (not shown). Since objective 9 reverses and inverts the image as shown at 15, an erecting series of reflectors is needed to give an upright image at plane 13. This is usually accomplished in binoculars with two porro prisms but is done in the present device with the series of four reflector surfaces 10, 2, 11, and 12; where 10 and 2 work together as a right angle pair handling the beam that carries pitch vibrations in a vertical plane perpendicular to all pitch axes. Accordingly, in FIG. 1, either reflector 10 or 2 could be stabilized. Since the incident bundle is assumed to comprise parallel rays and since a focus must occur at plane 13, it follows that reflecting components must be arranged so that the distance traversed by ray 8 from objective 9 to plane 13 must be equal to the focal length of objective 9. An accidental motion of the instrument case in pitch causes gyro 3 to precess about axis 5 according to limitations effected by dampener 6 in order to impress an angular movement through 7 onto reflector 2 that exactly compensates for image displacement which would have resulted from the original case motion.

FIGS. 2 and 3 show how a mechanism subassembly may be constructed within the viewer instrument case to house reflector 2 and gyro 3 with dampener 6. Gyro wheel 18 is made to revolve at high speed around stator assembly 19 on bearings 20 by suitable motor means powered by leads 21. Rotor bearings 20 are housed in a stud 22 which is secured with a large nut to gyro case 23. Trunnions 24 and 25 comprise axis 5 of FIG. 1, being the first and only gimbal axis, and are borne by bearings 26 which fit into frame plates 27 and 28 that are spaced apart by strut pieces 29 and 30. Leads 21 are threaded past one of the bearings 26 with as little flexing as practicable. The lower end of trunnion 24 is attached to the impeller of dampener device 6, which impeller is shown in section in FIG. 4A by two pieces 33 and in FIG. 4B by the cross-hatched piece 33, FIG. 4B having its section taken along the line indicated in FIG. 4A. The impeller then comprises two paddles 33 connected by a thin front disc portion 34. The dampener assembly 6 is secured by spacer blocks 35 to frame plate 27. The dampener is filled with a viscous fluid of fairly inert composition like Dow Corning 200 which is sealed within the cavity by "O-Ring" seals 36. Keyed at 37 against rotation is a fence like piece or gate 38 whose position can be adjusted axially with screw 39 that is keyed against axial movement by ring 40. Rotary movement of 24 requires 33 to push fluid around the several interstices built in and so will be resisted as a function of angular velocity. Adjusting gate 38 closer to impeller 33 will decrease the gaps between them and cause an increased resistance to rotation of gyro 3 about 5 as represented by an increase in damping constant C. In developement work with floated gyros a satisfactory ratio for H/C has been 0.5 for which dampener 6 can easily be set. After considering that light beams change their direction through twice the angle their reflecting surface is altered, a suitable ratio for driving 2 from 3 becomes 4:1. Referring further to FIGS. 2 and 3, bearings 41 fit into struts 29 and 30 and carry the square axle 42 to which is attached reflector surface 2 and bevel gear sector 43. Bevel drive gear 44, secured to upper gyro trunnion 25, may have a one-inch diameter; thereby setting the radius for sector 43 at two inches. At the right end of square shaft 42 in FIG. 2 crank 46 is attached which is shown in FIG. 5 reacting against spring leaves 47 when gyro 3 deflects in bearings 26 driving sector 43 from pinion 44. Spring leaves 47 are spaced away from frame strut 30 by block 48 and can be made up of graduated lengths that come into play in increasing numbers to offer an exponential torque versus deflection characteristic. When the instrument case is moved steadily about the axis being stabilized but gradually faster in the same direction, reflector 2 is permitted to deflect through an increasingly larger angle from its central or neutral case position which is pictured in the drawings, taking up a given angle for a given speed. This is the action of the single-degree-of-freedom gyro in the rate mode which is also ideal for returning gyro 3 to center whenever case motions desist. An eccentricly mounted stud 49 may provide adjustment for zero position. Spring 47 will also wash out error that may accumulate in the position of reflector 2 as the gyro-dampener continues to integrate cyclic velocities with time. Finally, the centering tension is proper for "panning" an optical viewer, especially a movie camera, about the yaw or azimuth axis.

Having provided a mechanism subassembly depicted in FIGS. 1 through 5 for stabilizing an image against accidental angular motion about one axis which was chosen as pitch, the problem may now be considered for a second axis simultaneously, which axis will be yaw. As principal ray 8 in FIG. 1 was committed to a vertical plane by reflectors 10 and 2 so that either could be used for pitch stabilization, said ray 8 is moving about a horizontal plane in reflecting in to and out of reflectors 11 and 12 so that either of those can be used for yaw stabilization. If reflector 11, adjacent to 2 of FIG. 1, is chosen, its stabilizing mechanism can line up with the one depicted in FIG. 2 for pitch to form an inline assembly such as shown in FIG. 6. Since the gyro-dampener output axis of each subassembly is perpendicular to the axis being stabilized, said output axes may be oriented parallel in a longitudinal direction, leaving the reflector pivot and spin axis of one to be twisted ninety degrees as pictured in FIG. 6. The two subassemblies are identical, each ending in a plate 52 seen in FIG. 7, said plates being symmetrical about two perpendicular lines to facilitate orienting the yaw subassembly 53 at right angles to the pitch subassembly 54 where they join. As in FIG. 1 then, ray 8, after leaving reflector 10, reflects off 2 and 11 in the twin stabilizer of FIG. 6 and continues toward 12.

By causing the entering ray bundle illustrated in FIG. 8 to take a bend into a perpendicular plane still containing the vibrations before impinging a stabilizing surface, the pivot axis for said surface is arranged parallel to the gyro-dampener output axis. This permits a more compact and much simpler mechanism for each stabilizer subassembly since parallel shafts allow common bearing support pieces and conventional spur gearing. Since the instrument case is held upright in front of the operator for FIG. 8 and the image is to be stabilized in pitch in the same manner as for FIG. 1, the ray bundle may be followed by tracing the principal ray 55 as it traverses objective lens 9 horizontally downward in the plane of the paper, reflects off mirror 56 still horizontal and to the left, reflects off stabilizing mirror 57 vertically up and out of the plane of the paper, reflects off mirror 58 horizontal again and to the right, reflects off mirror 59 horizontally downward and finally converges on the image plane at 60 whence it continues in a straight line through the ocular 14. FIG. 9 shows a subassembly for the stabilizer device diagrammed in FIG. 8 in the same way FIG. 2 is the mechanical equivalent of FIG. 1. In FIG. 9 gyro 61 is carried on bearings 62 and is actuating dampener 63. This shaft rotation at gear 64 is imparted to gear sector 65 which is attached to reflector 57 and to spring retension crank 66 through a common axle supported by bearings 67. A reflector array suitable for incorporating two of these subassemblies with reflector and gyro-dampener axes parallel per FIG. 9 has been worked out for image stabilization about two axes. However, its details are presumed to be more a matter of product design and therefore beyond the scope of this presentation.

In practical usage a mechanism according to either of FIGS. 2 or 9 may be improved into a further embodiment by expanding the arc travel of gyro-dampener output shaft with respect to the stabilized reflector so that control will be smoother and will have less apparent dead spot. This lessenning of sensitivity required of the gyro-dampener combination may be accomplished by connecting to move together the existing stabilized reflector with a neighbor that functions on a parallel axis in nominally forming a right angle pair as shown in FIG. 10. Ray bundle 70 enters from the right, reflects off mirror 71 up to 72, and then reflects off 72 as shown by 73 in a direction parallel to its entrance as long as 71 and 72 are at right angles. The mirrors or reflectors are connected by a belt with teeth or timing belt 74 which surrounds gears 75 and 76 that are secured to reflectors 71 and 72 respectively. Gear 75 has fewer teeth (perhaps 10%) than 76. Reflector 71 is driven by dampened gyro 77 through gears 78 and 79 in the same manner as 64 and 65 of FIG. 9 except that the ratio may be more nearly 1:1. Reflectors 71 and 72 are exactly at right angles in their neutral position making equal angles with the gyro spin axis as pictured in FIG. 10. As gear 79 is driven 10 degrees carrying gear 75 and reflector 71, gear 76 rotates slightly less (perhaps 9 degrees) and the small difference angle is half that which the reflected beam 73 becomes nonparallel to the incident 70 (2 degrees). Thus the angle between incident and reflected beams becomes many times less than rotation of the gyro-dampener on its output shaft. Should this double mirror arrangement of FIG. 10 become feasible in operation with a single-axis stabilizer, it could be developed for use in image stabilization for two axes as well. Again this developement work is more a matter of product design and therefore beyond the scope of this presentation.

Further embodiments would incorporate a beam splitter to exit the ray bundle through two oculars. A simple arrangement in front of the exit pupil pleases the operator by involving both eyes, an expedient that has become quite conventional. A more complex binocular arrangement would be necessary to achieve the stereoscopic effect since the system must double commencing with two objectives.

I claim:

1. In an optical viewer for counteracting the effect of frame oscillation, an image stabilizer including
   (1) a mirror mounted on a frame rotatable about a first axis;
   (2) a gyroscope spinning about an axis perpendicular thereto;
   (3) a gimbal housing the spinning gyroscope rotatably mounted to said frame perpendicular to said spin axis and fixed in a dampening member at one end and to means for rotating said mirror at its other end;
   (4) dampening means for said dampening member such that the angle of gyro precession is directly proportional to the angle of rotation of the frame causing said precession for small frame rotations.

2. In an optical viewer as set forth in claim 1 for arranging the rotatable mirror axis parallel to the gyro gimbal axis, the inclusion of another reflector surface fixedly set on the optic path in front of said rotatable mirror to deflect the incident ray bundle through a right angle while still containing the oscillation.

3. In an optical viewer for counteracting the effect of frame oscillation about two axes simultaneously, the inclusion of two image stabilizers, each as set forth in claim 1, having their spin axes separated by the angle between the said two axes being stabilized and their rotatable mirrors connected in optic series.

* * * * *